United States Patent [19]
Swinney

[11] 3,896,686
[45] July 29, 1975

[54] BRAKE SHOE ADJUSTMENT TOOL

[76] Inventor: Morris E. Swinney, 4511 Shoalwood, Austin, Tex. 78756

[22] Filed: May 3, 1973

[21] Appl. No.: 356,797

[52] U.S. Cl. ............... 81/3 R; 188/1 R; 33/180 AT
[51] Int. Cl. ........................................... F16d 65/42
[58] Field of Search.... 81/3 R; 33/180 AT, 181 AT; 24/263 SB, 81 R, 81 CC, 81 LP, 24; 85/3 S, 5 P; 188/1 R

[56] References Cited
UNITED STATES PATENTS

| | | | |
|---|---|---|---|
| 1,011,594 | 12/1911 | Dunham | 24/263 SB |
| 1,360,200 | 11/1920 | Dowd | 85/3 S |
| 1,803,431 | 5/1931 | Hill | 24/81 LP |
| 2,246,834 | 6/1941 | Bowman | 85/3 S |
| 2,733,629 | 2/1956 | Vogt | 85/3 S |
| 3,550,729 | 1/1969 | Underwood | 188/1 R |
| 3,552,704 | 1/1971 | Pond | 85/3 S |

Primary Examiner—Al Lawrence Smith
Assistant Examiner—Roscoe V. Parker

[57] ABSTRACT

A brake tool which is utilized by a mechanic to preadjust a pair of lined brake shoes in a brake drum includes a shaft, a stop member fixed to one end of the shaft and a biased pin member slidably mounted on the shaft. The ends of the brake shoes are inserted between the fixed member and pin member to tightly grip the shoes and automatically space the ends of the shoes an appropriate distance. The brake shoes are then inserted into a brake drum and adjusted by appropriate movement of an adjustable star wheel spacer. Finally, the adjusted brake shoes can be removed from the brake drum and attached to the wheel hub of the automobile or other vehicle.

3 Claims, 9 Drawing Figures

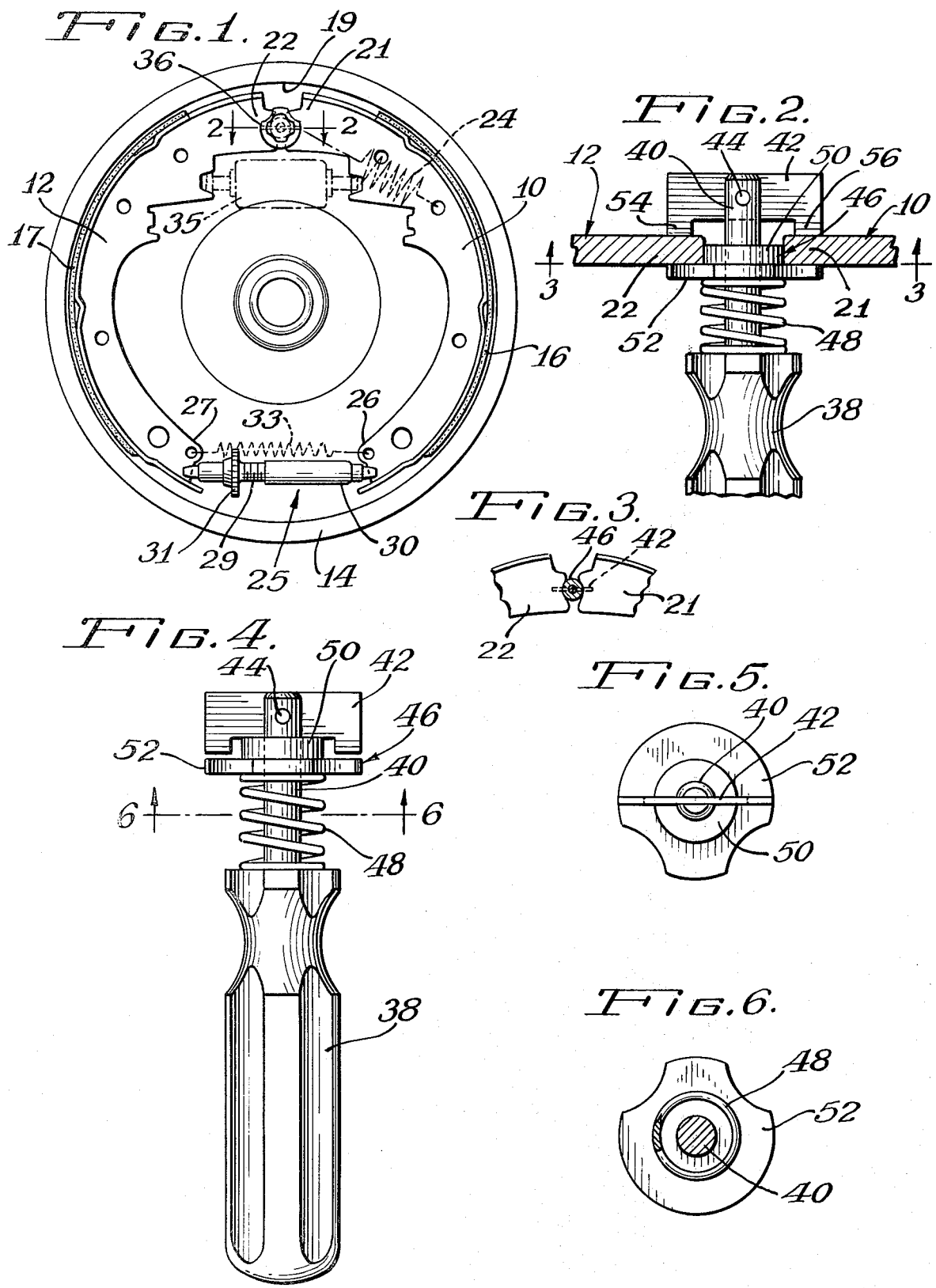

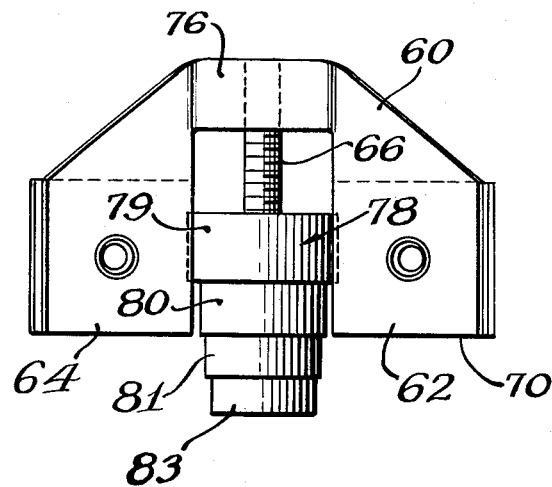
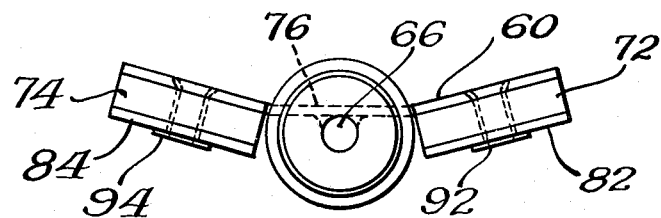
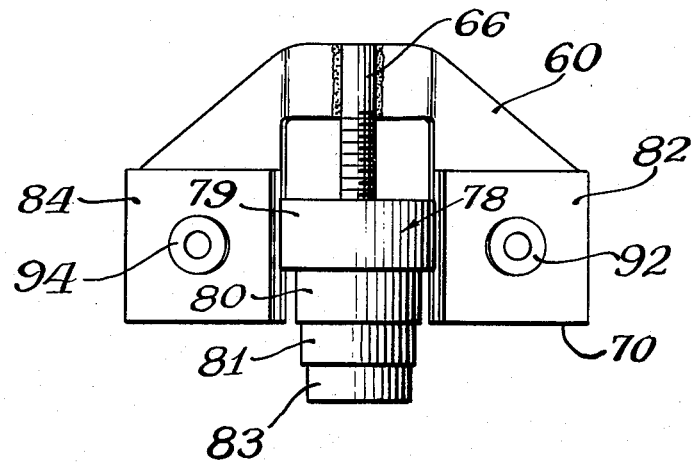

BRAKE SHOE ADJUSTMENT TOOL

BACKGROUND OF THE INVENTION

In a principal aspect, the present invention relates to an improved tool utilized for the spacing adjustment of brake shoes.

On most modern vehicles, the shoe brakes are self-adjusting. That is, a mechanism associated with the brake shoes compensates for the wear thereof and automatically adjusts the effective diameter of the brake shoes relative to the brake drum of the vehicle. The brake shoes thus define a generally cylindrical outside surface which almost engages the generally cylindrical inside surface of a brake drum.

Consequently, when brake shoes are originally attached to a vehicle axle, it is desirable to preset them to a diameter slightly less than the inside diameter of the brake drum. Presetting the diameter of the brake shoes makes it possible to slip the drum over the shoes once the shoes are installed on the axle backing plate. Without such adjustment, it may be necessary to operate the automobile in reverse to effect automatic brake shoe adjustment.

Alternatively, since most drum brake constructions include a means for access to the interior of the assembled shoes and drum on the back side of the brake, a tool such as a screw driver may be inserted into the brake housing to operate an adjustment mechanism that spaces the brake shoes properly. This is a very undesirable procedure because access to the interior of the brake housing is difficult and also because a great amount of time is required to perform the procedure.

Adjustment of the diameter of the brake shoes relative to the diameter of the brake drum before the brake drum is attached to the wheel hub or backing plate associated with the axle of the vehicle has been done in the past by various means. For example, an inside-outside caliper can be used. Alternatively, the adjustment has been made by a hit and miss method.

Still another method of adjustment has been utilizing spacing pins which have a diameter equal to the diameter of the pivot pin associated with the backing plate. After the brake shoes are inserted in a drum housing, these pins are inserted between one end of the brake shoes as the opposite ends are adjusted.

All of these methods are unsatisfactory for one reason or another. For example, accurate measurement of the diameters of the brake shoes and drum is difficult. The method of guessing the appropriate diameter is, obviously, not very accurate or reproducible. The cylindrical pin which is utilized in place of the backing plate pin is not effective because the ends of the brake shoe adjacent the pivot pin can be easily jarred and misaligned thereby causing errors in the adjustment of the brake shoes.

The difficulties discussed above relative to the prior art are believed to have been overcome by the subject matter of the present invention.

SUMMARY OF THE INVENTION

In a principal aspect, the present invention comprises a tool for use with a pair of brake shoes of the type having an outside shoe lining surface, a first end for engagement with a pivot pin of a vehicle backing plate and a second end for engagement with adjustable spacing means.

One embodiment of the tool includes a mounting shaft with an attached first fixed member and a second slidable member that is biased toward the fixed first member. One of the members includes a projecting pin portion which is dimensionally equivalent to the pivot pin of the vehicle backing plate. The projecting pin portion may be inserted between the first ends of the brake shoes as the first and second members compress the first brake shoe ends. The adjustable space means may then be operated to properly fix the diameter of the brake shoes.

Another embodiment includes a mounting bracket with a shaft extending therefrom. A cylindrical pin is attached to the threaded shaft and extends beyond a pair of opposed, parallel arms defining the mounting bracket. Magnets are included as part of the arms. The first ends of the brake shoes are engaged and held by the magnets while being spaced from one another by the pin. The pin may be translated along the shaft to project a desired diameter portion of pin between the brake shoe ends.

Thus, it is an object of the present invention to provide a tool for use in adjustment of brake shoes which tool properly spaces the ends of the brake shoes which normally engage the pivot pin of the brake backing plate and simultaneously grasps the ends of the brake shoes holding them firmly while adjustment is made to the spacing of the opposite ends of the brake shoes.

Still a further object of the present invention is to provide a brake adjustment tool comprised of first and second members mounted on a shaft and biased toward one another to grip the brake shoes tightly.

Another object of the present invention is to provide a brake shoe adjustment tool which utilizes magnets to attract and hold the ends of separate shoes against a pin while the spacing of the opposite ends of the shoes is adjusted.

Still another object is to provide a brake shoe adjustment tool having a unitary spacing pin which may be translated or moved to cooperate with the fixed ends of a pair of brake shoes and thus provide a desired spacing of those fixed ends while the spacing of the opposite ends is being adjusted.

These and other objects, advantages and features of the invention will be set forth in the detailed description which follows.

BRIEF DESCRIPTION OF THE DRAWING

In a detailed description which follows, reference will be made to the drawing comprised of the following FIGS.:

FIG. 1 is a plan view of a pair of brake shoes positioned in a brake drum with a first embodiment of the tool of the present invention utilized to hold and space the brake shoes;

FIG. 2 is a top cross-sectional view of the tool of the present invention as utilized in combination with a pair of brake shoes taken substantially along the line 2—2 in FIG. 1;

FIG. 3 is a plan cross-sectional view of the brake shoes and tool of the present invention taken substantially along the line 3—3 in FIG. 2;

FIG. 4 is a top plan view of the first embodiment of the improved tool of the present invention;

FIG. 5 is an end view of the first embodiment of the improved tool of the present invention;

FIG. 6 is a cross-sectional view of the brake adjustment tool taken substantially along the line 6—6 in FIG. 4;

FIG. 7 is a front plan view of a second embodiment of the brake adjustment tool;

FIG. 8 is an end view of the tool of FIG. 7; and

FIG. 9 is a back plan view of the tool of FIG. 7.

DESCRIPTION OF THE PREFERRED EMBODIMENT

FIGS. 1 through 6 illustrate a first embodiment of the invention. FIGS. 7-9 illustrate a second embodiment. FIG. 1 illustrates a typical shoe brake construction with which the tool of the present invention is being utilized. As will be recognized by those skilled in the art, a typical self-adjusting shoe brake assembly includes a first brake shoe 10 and a second brake shoe 12 which are positioned within a brake drum 14. The drum 14 will generally rotate with the wheel of the vehicle whereas the shoes 10 and 12 are fixed in some manner to a backing plate or the like on one end of the axle of the vehicle.

The outside diameter of the shoes 12 and 14 is slightly less than the inside diameter of the drum 14 in order to permit free wheeling operation of the vehicle. Applying the brakes will cause the shoes 10 and 12 to be spread thereby causing brake linings 16 and 17 associated with the first and second shoes 10 and 12 respectively to engage the inside surface 19 of the drum 14.

When installed on a backing plate (not shown) associated with an axle of the vehicle, the shoes 10 and 12 have free ends 21 and 22 which engage a pivot pin (not shown) associated with the backing plate. The shoes, for example, shoe 10, are generally maintained against the pivot pin by a spring 24 as shown in phantom in FIG. 1.

Opposite ends 26 and 27 of the shoes 10 and 12 respectively are spaced a fixed distance apart by means of an adjustment mechanism 25 including an adjustment screw 29, a bolt 30 and a star wheel 31. The opposite ends 26 and 27 are maintained in engagement with the adjustment mechanism by a spring 33 shown in phantom interconnecting ends 26 and 27. A brake cylinder 35 in phantom may be energized by a brake pedal to spread the shoes 10 and 12 into engagement with the drum 14 as previously described.

As explained in the Background of the Invention, it is desirable to preadjust the effective diameter of the brake shoes 10 and 12 relative to the brake drum 14 prior to attachment or assembly of the brake shoes 10 and 12 to the backing plate associated with the vehicle axle. This is done by utilizing the tool 36 of the present invention in place of the pivot pin (not shown) associated with the backing plate.

The tool 36 is inserted between the free ends 21 and 22 of the brake shoes 10 and 12. Tool 36 grasps the free ends 21 and 22 and properly spaces them. The shoes 10 and 12 and adjustment mechanism 25 may then be inserted within the brake drum 14 as illustrated in FIG. 1. The star wheel 31 is then adjusted to provide a desired effective diameter of the shoes 10 and 12.

Reference is now made to FIGS. 2 through 6 which illustrate in greater detail the construction of the first embodiment of the tool of the present invention. Referring particularly to FIG. 4, the tool includes a handle 38 with a projecting shaft 40. A transverse planar sheet member 42 is fixed to the end of the shaft 40 by a pin 44. An annular slidable member 46 is mounted on the shaft 40 and biased by a spring 48 into or toward engagement with the fixed member 42. A shaped flange 52 of the member 46 is engaged by the spring 48. In the embodiment shown, the slidable member 46 includes a projecting pin portion 50 which is dimensionally equivalent in diameter to the pin associated with the backing plate of the brake construction.

FIG. 2 illustrates an enlarged view of the manner in which the tool of FIG. 4 engages and holds the brake shoes 10 and 12 while their diameter is adjusted within the brake drum 14. That is, the slidable member 46 is biased directly into engagement with the ends 21 and 22 so that the ends 21 and 22 are maintained between the flange 52 and projecting tabs 54 and 56 associated with fixed member 42. Since the pin portion 50 is dimensionally equivalent to the pin on the backing or brake mounting plate of the brake system, the ends 21 and 22 are properly spaced from one another. Thus, by utilizing the tool of the present invention, it is possible to properly adjust the mechanism 25.

Of great importance is the fact that the spring 48 cooperatively acting against the slidable member 46 causes the ends 21 and 22 to be firmly held in position. This eliminates the possibility of slippage and consequent misadjustment of the mechanism 25. The prior art methods which were used to effect such an adjustment took much longer than adjustment performed with the tool of the present invention and did not provide for firm gripping of ends 21 and 22 during adjustment. Additionally, the prior art methods were not always as accurate as the method utilizing the tool of the present invention.

The second embodiment of the invention is illustrated in FIGS. 7, 8 and 9. This embodiment is comprised of a bracket 60 which includes a pair of parallel spaced bifurcated arms 62 and 64. A threaded shaft or rod 66 is positioned between the bifurcated arms 62 and 64. The rod 66 is generally parallel to the arms 62 and 64. Arms 62 and 64 include substantially co-planar ends 68 and 70.

Magnets 72 and 74 are attached respectively to the arms 62 and 64 by means of plates 82 and 84 and rivets 92 and 94 extending through the respective plates 82, 84, magnets 72, 74 and arms 62, 64. As illustrated in FIG. 7, the bracket 60 and, in particular, the arms 62 and 64 are not co-planar. That is, the bracket 60 includes a throat portion 76 which is curved so that the magnets 72 and 74 are slightly above the centerline axis of the rod 66.

A cylindrical pin 78 is threadably attached to the threaded rod 66. Pin 78 in the embodiment shown is comprised of four concentric cylindrical portions 79, 80, 81 and 83 respectively. Each separate cylindrical portion 79, 80, 81 and 83 is representative respectively of a particular pin diameter associated with a backing plate of a brake shoe system. The pin 78 may be easily threaded or translated along the rod 66 so that anyone of the cylindrical portions 80, 81 or 83 will be projected beyond the ends 68 and 70.

When being utilized, the embodiment of FIGS. 7, 8 and 9 is positioned in cooperation with first ends 21 and 22 of brake shoes 10 and 12. The pin 78 is inserted between the ends 21 and 22. The arms 62 and 64 and, in particular, the magnets 72 and 74 cooperatively engage and hold the ends 21 and 22. In this manner a desired cylindrical portion 80, 81 or 83 may be utilized to space the ends 21 and 22 of brake shoes 10 and 12 while the magnets 72 and 74 act to hold the ends 21 and 22 rigidly in position during adjustment of the brake shoes 10 and 12.

A particular advantage of this construction is that a single pin 78 may be utilized for anyone of a number of different types and styles of brake shoe adjustment. This is possible because the pin 78 is translatable along the axis of rod 66 in order to expose the desired cylindrical portion 80, 81 or 83 for engagement with the ends 21 and 22 of the brake shoes 10 and 12. Of course, the fact that there are three cylindrical portions 80, 81 and 83 for engagement between ends 21, 22 is not a limiting feature of the invention. Thus, it is to be understood that the invention shall be limited only by the following claims and their equivalents.

What is claimed is:

1. A tool for use with a pair of brake shoes of the type having a shoe surface, a first end for engagement with a pivot pin of a vehicle hub brake assembly and a second end for engagement with adjustable spacing means, said tool comprising, in combination:

a mounting shaft;

a first member fixed to one end of said shaft;

a second member slidably mounted on said shaft; and means for biasing said second member toward said first member, said members including means for engaging at least a portion of said first ends of said shoes, one of said members including a projecting pin portion dimensionally equivalent to said pivot pin and positionable between said first ends to space said ends a predetermined distance.

2. A tool for use with a pair of brake shoes of the type having a shoe surface, a first end for engagement with a pivot pin of a vehicle hub brake assembly and a second end for engagement with adjustable spacing means, said tool comprising, in combination:

a handle;

a shaft extending from said handle;

a first stop member extending outward from the axis of the shaft and fixed to the end of the shaft;

a pin member slidably mounted on said shaft and concentric with said shaft, said pin member including a cylindrical spacer portion having the same diameter and shape as said pivot pin where said pivot pin is normally engaged between said first ends, and a flange portion; and spring means for biasing said members toward each other to engage the first ends between the flange portion and said first member, said pin portion spacing said first ends.

3. The improved brake tool of claim 2 wherein said first stop member includes a transverse portion extending in opposite directions outwardly from said shaft, and tabs extending from said transverse member toward said flange portion of the pin member, said tabs being spaced a greater distance than the diameter of the spacer portion of the pin member.

* * * * *